I. E. PALMER.

HAMMOCK.

APPLICATION FILED FEB. 1, 1908.

Reissued Apr. 9, 1912.

13,401.

Witnesses:
Edwin F. Luce
Irving U. Townsend

Inventor:
Isaac E. Palmer,
by Emery and Booth
Attorneys

COLUMBIA PLANOGRAPH CO., WASHINGTON, D. C.

UNITED STATES PATENT OFFICE.

ISAAC E. PALMER, OF MIDDLETOWN, CONNECTICUT.

HAMMOCK.

13,401. Specification of Reissued Letters Patent. Reissued Apr. 9, 1912.

Original No. 805,816, dated November 28, 1905, Serial No. 264,223. Application for reissue filed February 1, 1908. Serial No. 413,881.

*To all whom it may concern:*

Be it known that I, ISAAC E. PALMER, a citizen of the United States, and a resident of Middletown, in the county of Middlesex and State of Connecticut, have invented a new and useful Improvement in Hammocks, of which the following is a specification.

My invention relates to a hammock, and more particularly to a hammock for infants in which the walls at the side are sufficiently pronounced to prevent liability of the infant rolling out.

A practical embodiment of my invention is represented in the accompanying drawings, in which—

Figure 1:
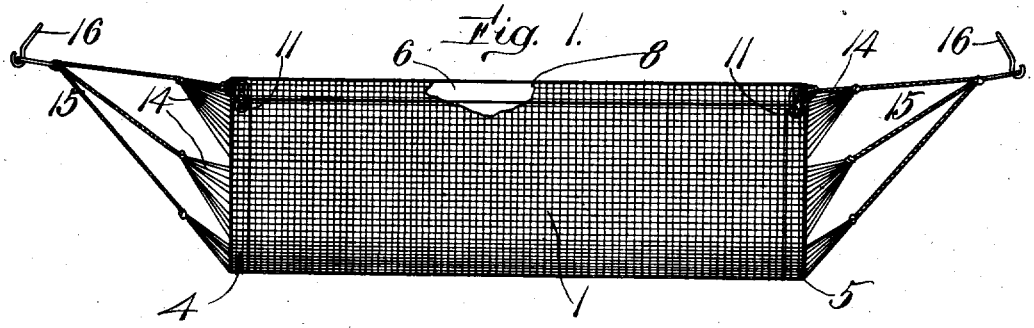
Figure 2:
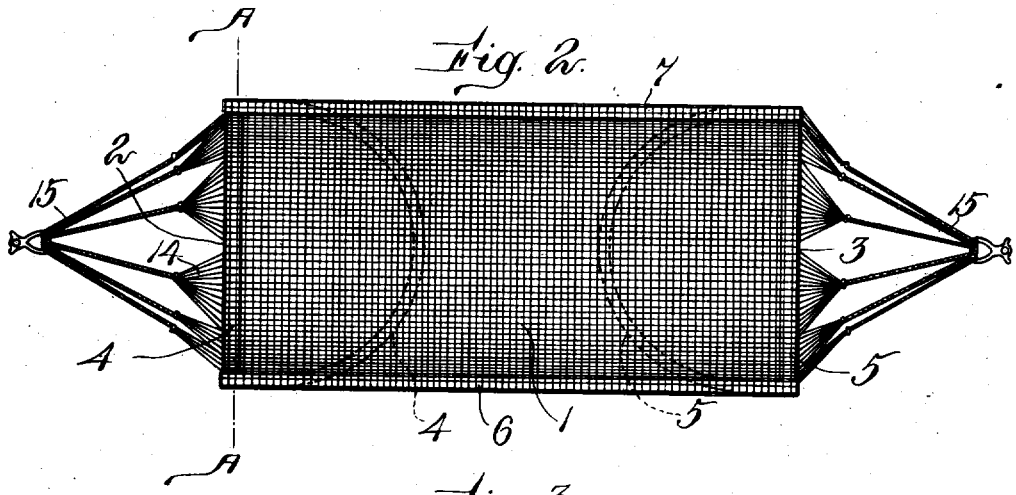
Figure 3:
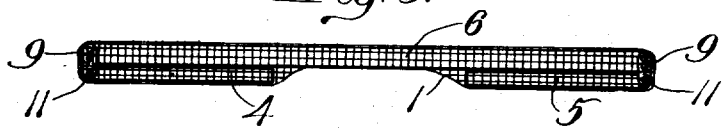
Figure 5:
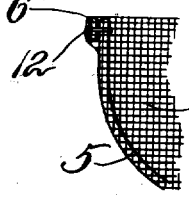
Figure 4:
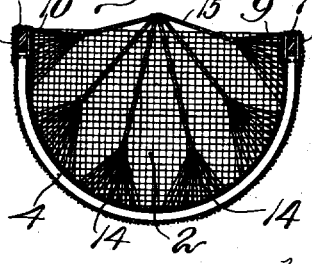

Figure 1 is a view of the hammock in side elevation, partly broken away; Fig. 2 is a top plan view showing in dotted lines the folded position of the end spreaders; Fig. 3 is an edge view showing the position of the end spreaders when folded into or approximately into the plane of the side rails; Fig. 4 is a transverse section in the plane of the line A A of Fig. 2; Fig. 5 is a view in detail of a modified form of hinge connection between the end spreader and rail; and Fig. 6 is a view in detail, showing a modified form of end spreader.

The body of the hammock is denoted by 1. It may be, as is usual, formed of woven gauze or netting of sufficient strength, or other suitable flexible material may be employed. It is preferably provided with ends 2 and 3, making when set up for use, a bed having side and end walls.

The end spreaders (denoted by 4 and 5,) as represented in Figs. 1 to 5 inclusive, have a general U shape and have their ends connected to the side rails 6 and 7. These rails 6 and 7 extend from end to end of the body along the upper edges of the opposite sides of the body and serve to maintain it distended longitudinally and prevent the possibility of the infant pulling the side down from its normal level position to an extent which would render it liable to fall out. The side rails 6 and 7 may be connected with the body in any well-known or approved manner and at such frequent intervals throughout the length of the body as will hold the edges of the latter in position. The rails are here shown inserted in pockets 8 formed at the opposite edges of the body by turning over the edges of the body and sewing them fast to the body itself. In the form represented in Figs. 1 to 4, inclusive, the spreaders have their ends hinged to the side rails by providing the side rails with a pair of ears 9 and 10 and passing a hinge-pintle 11 through the ears and through the end of the spreader inserted between the ears. This permits the spreader to be swung into a position approximate to the plane of the side rails when it is desired to pack the hammock for transportation or storage. The ends of the spreader may, however, be hinged to the side rails by simply passing a cord or other suitable fastening device 12, as shown in Fig. 5, directly through a hole in the end of the spreader and a corresponding hole in the end of the side rail.

Figure 6:
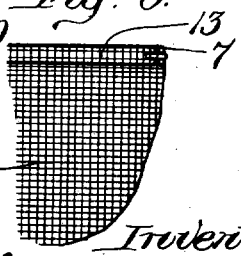

Instead of making the spreader a general U shape it may assume a substantially straight form, as shown in Fig. 6, where the spreader is denoted by 13 and made fast at its opposite ends to the corresponding ends of the rails to hold them separated at the proper distance.

The body of the hammock, with its spreaders and side rails, is conveniently suspended by means of groups of suspension-loops 14, having suspension-cords 15 attached thereto and leading from the suspension-loops to the supporting device 16, as is common.

What I claim is—

1. A hammock comprising a body portion of suitable flexible material, side rails from which the body portion depends, spreaders hinged to the opposite ends of the side rails for spacing them apart and suspension devices at the opposite ends of the hammock for suspending it from a suitable support.

2. A hammock comprising a body portion of suitable flexible material, side rails from which the body portion depends, spreaders having a general U-shape and hinged at their ends to the side rails for spacing them apart, the said spreaders having a swinging movement into a position approximate to the plane of the side rails and suspension devices at the opposite ends of the hammock for suspending it from a suitable support.

3. A hammock comprising a body portion of suitable flexible material formed to present well defined sides and ends combined with side rails from which the body depends, spreading means at the ends providing fixed spacing of the side rails and defining the bottom outline at the ends, suspension means distributed along the spreading means and supporting the hammock at intervals transversely thereof, the hammock body being collapsible flatwise into the plane of the normally positioned side rails, while the spreading means continues to maintain the fixed spacing of the side rails.

4. A hammock comprising a body portion of suitable flexible material formed to present in use well defined sides and vertical ends combined with side rails from which the body depends, spreading means at the ends providing fixed spacing of the side rails and defining the bottom outline at the ends and maintaining in use the said ends vertical, suspension means distributed along the spreading means exterior to said ends and supporting the hammock at intervals transversely thereof, the hammock body being collapsible into the plane of the normally positioned side rails while the fixed spacing of the latter is preserved by said spreading means.

5. A hammock comprising a body portion of suitable flexible material, formed to present well defined sides and ends, combined with side rails from which the body depends, spreading means at the ends, movable with respect to said side rails and into substantially the plane of the latter, said spreading means providing fixed spacing of the side rails and defining the bottom outline at the ends, and suspension means connected to the ends of the body portion, the hammock body being collapsible flatwise into the plane of the normally positioned side rails upon movement of said spreading means into substantially said plane, and without disturbing the spaced relation of said side rails.

In testimony that I claim the foregoing as my invention I have signed my name, in presence of two witnesses, this 30th day of January A. D. 1908.

ISAAC E. PALMER.

Witnesses:
FRED E. FOWLER,
CHAS. M. SAUER.

Copies of this patent may be obtained for five cents each, by addressing the "Commissioner of Patents, Washington, D. C."